P. N. BURKE.
Cooking-Range.

No. 132,437.

2 Sheets--Sheet 1.

Patented Oct. 22, 1872.

Witnesses.
R. T. Campbell
J. N. Campbell

Inventor
Peter N. Burke
by his attys
Mason Fenwick & Lawrence

P. N. BURKE.
Cooking-Range.
No. 132,437.
2 Sheets--Sheet 2.
Patented Oct. 22, 1872.
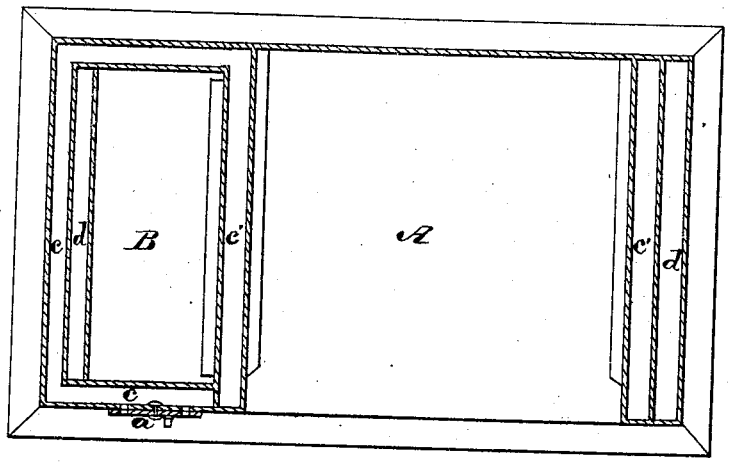
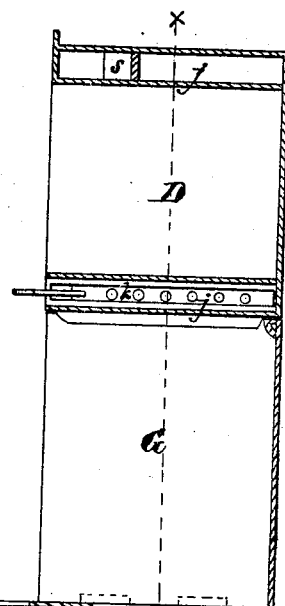
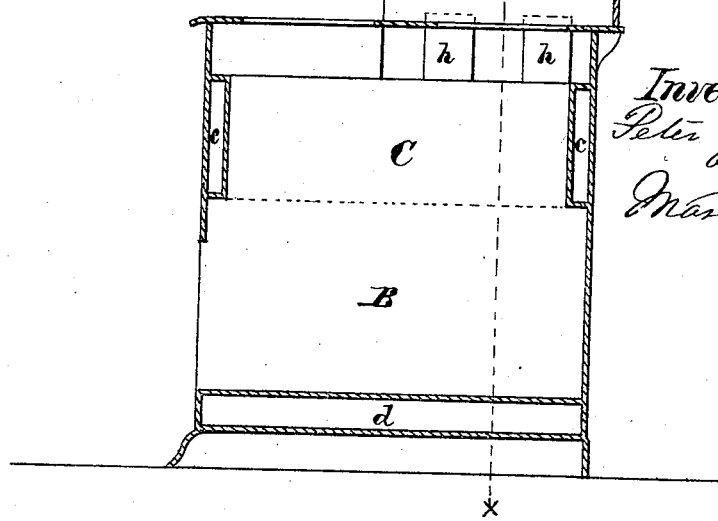
Witnesses.
P. T. Campbell
J. N. Campbell
Inventor
Peter N. Burke
by his Attys
Mason Fenwick & Lawrence

UNITED STATES PATENT OFFICE.

PETER N. BURKE, OF BROOKLYN, NEW YORK.

IMPROVEMENT IN COOKING-RANGES.

Specification forming part of Letters Patent No. 132,437, dated October 22, 1872.

*To all whom it may concern:*

Be it known that I, PETER N. BURKE, of Brooklyn, in the county of Kings and State of New York, have invented certain Improvements in Ranges; and I do hereby declare that the following is a full, clear, and exact description thereof, reference being had to the accompanying drawing making part of this specification, in which—

Figure 1:
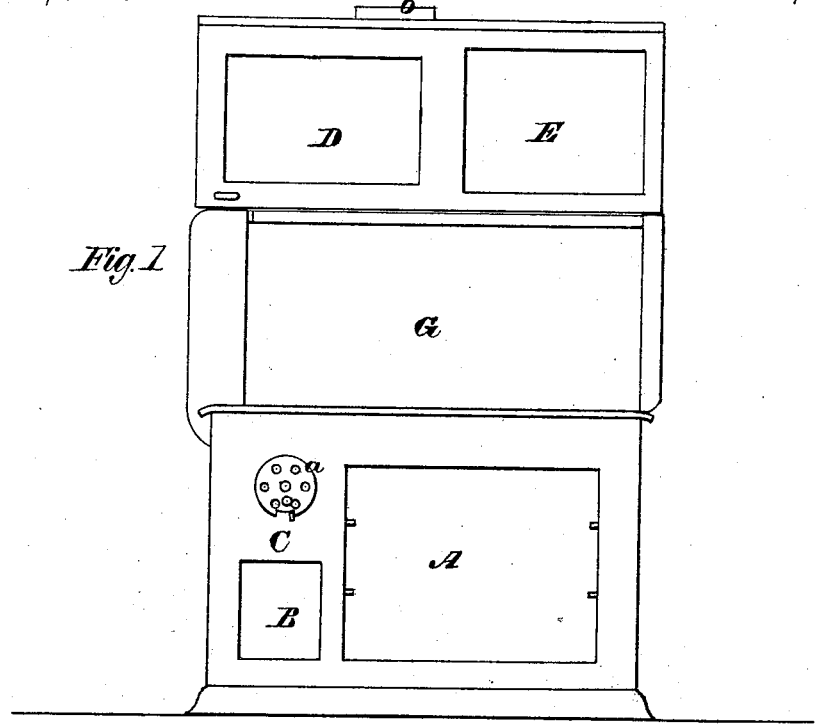
Figure 2:
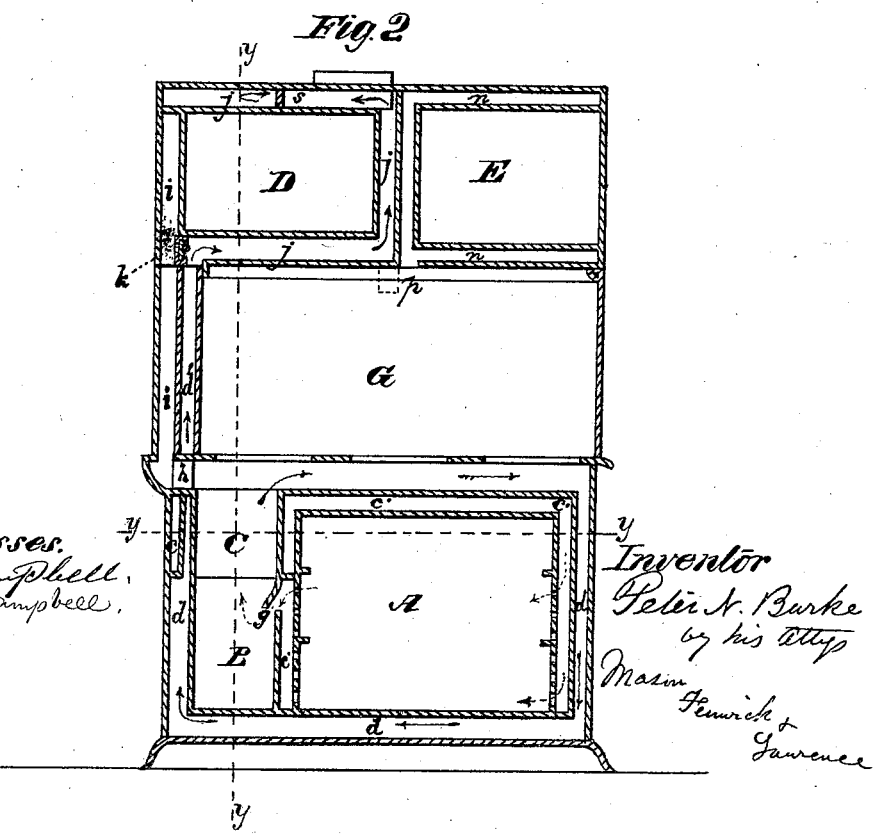

Figure 1, Plate 1, is a front elevation of the range; Fig. 2, Plate 1, is a section through the range taken in the vertical plane indicated by dotted line $x\,x$ in Fig. 4; Fig. 3, Plate 2, is a section taken in the horizontal plane indicated by dotted line $y\,y$, Fig. 2; and Fig. 4, Plate 2, is a section taken in the vertical plane indicated by dotted line $z\,z$ in Fig. 2.

Similar letters of reference indicate corresponding parts in the several figures.

This invention relates to certain novel improvements on cooking-ranges, whereby a very large amount of oven-space is obtained with increased heating facilities, as will be hereinafter explained.

The following description of my invention will enable others skilled in the art to understand it.

In the accompanying drawing, A represents the lower or main oven of the range; B is the ash-pit; C is the fire-chamber; D is an elevated oven; E is an elevated warming-closet; and G is a space between the elevated oven and the top of the range.

It will be seen, by reference to Figs. 1, 2, and 3, that the lower oven occupies a very large part of the body of the range, and that the fire-chamber and its ash-pit are arranged at one end of the oven, beneath the elevated oven D.

When it is desired to use the oven A for cooking purposes, a damper, K, (see Figs. 2 and 4,) is shut, which causes the products of combustion to pass from the fire-chamber C over the oven, thence down through a flue, $d$, thence beneath the oven and ash-pit, thence up alongside of the ash-pit and fire-chamber, thence up through flues $h$ and $d'$ beneath the elevated oven D. Here the products pass through flues $j$ beneath the oven D, up one side of the oven and over it to the escape-pipe $b$. The diagonal partition $s$, between the two upper walls of the oven D, causes the products to circulate over the entire upper surface of the oven before escaping from the flue $j$.

It will be seen from the above description of the course of the heated currents that they are reheated, or heated a second time, while passing through the ascending flues $d\,h$ alongside the fire-chamber. This is very important in connection with the elevated oven D, for the reason that a large proportion of the heat of the products of combustion will be given off to the oven A, and by the time the products reach the ascending part of the flue $d$ they are comparatively cool and would not properly heat the said elevated oven D; but by reheating the products after they have circulated around the lower oven A the elevated oven is made available for cooking purposes.

During the operation of the oven A it is ventilated by heated air in the following manner: Air is admitted into a tube or flue, $c$, through a register, $a$, at the front of the fire-chamber C, and conducted around this chamber to a wide flue, $c'$, over the oven A, thence down one side of the oven, through it, and out through $g$ into the ash-pit B. From this ash-pit the air which is, more or less, discharged with the vapor from the oven, rises through the grate into the bed of incandescent coals. For the purpose of having the air properly distributed through the oven, the perforations through the two oven-plates, shown in Fig. 2, increase in size from above downward. When the damper $k$ is open a direct communication will be allowed between the fire-chamber and exit-pipe $b$, and instead of the products of combustion passing around the oven A they will ascend between the pipes $h$ into a flue, $i$, thence through the open damper $k$ and through flues $j$, thus conveying the greatest amount of heat directly to the oven D. When the damper $k$ is shut the whole of flue $i$ is a dead-air flue, but when the damper is open the upper portion only of flue $i$ is a dead-air flue. Three sides of the warming-closet E have double walls in the space $n$, between which walls heated air is received through opening $p$; this, with the heat radiated from the top of the range and from flue $j$, will keep the interior of the closet E properly warm. For the purpose of equally distributing the heat over the surfaces of the oven-walls, the ascending part of flue $d$ may be made up of vertical pipes, increasing gradually in their diameters from the back to the front of the range; or vertical partitions might be similarly arranged either in the ascending part of the flue $d$, or in that part of flue $d$ which is beneath the oven A, or in both conjointly. If desirable there may be arranged, either in the wall of flue $d$ or in the wall of flue $j$, a damper for carrying off the fumes which rise while cooking on top of the range.

Having described my invention, what I claim as new, and desire to secure by Letters Patent, is—

1. The flue $d$, passing from the fire-chamber C around the oven A, and communicating with a flue, $j$, around the elevated oven D by means of pipes $h\ h$ and ascending flue $d'$, whereby the products of combustion are reheated after passing around the oven A on their way to the flue $j$ of oven, substantially as described.

2. The flue $i$ leading from the fire-chamber and into the flue $j$ of the elevated oven D, when the damper $k$ is open, substantially as described.

3. The combination of the two flues $i\ d$, damper $k$, and the flue $j$, around elevated oven D, substantially as described.

4. The air-flue $c$ leading from the register $a$ through flue $d$, and communicating with the sheet air-flue $c'$, which supplies air to the interior of the oven A, substantially as described.

5. The air-space $n$ and opening $p$, in combination with the elevated warming-closet E, substantially as described.

6. The combination of the oven A, space G, and the elevated oven D and warming-closet E, arranged and operated substantially as described.

PETER N. BURKE.

Witnesses:
 E. F. MYERS,
 W. E. SIMMONS.